INVENTORS
Heinz-Günther Plust
Carl Georg Telschow

United States Patent Office 3,418,167
Patented Dec. 24, 1968

3,418,167
SYSTEM FOR THE OPERATION OF A FUEL CELL WITH GAS DIFFUSION ELECTRODES
Heinz-Günther Plust, Spreitenbach, Aargau, and Carl Georg Telschow, Zurich, Switzerland, assignors to Aktiengesellschaft Brown, Boveri & Cie., Baden, Switzerland, a joint-stock company
Filed June 28, 1963, Ser. No. 291,409
Claims priority, application Switzerland, July 6, 1962, 8,139/62
4 Claims. (Cl. 136—86)

The present invention relates to fuel cells and more particularly to an improved arrangement for operating such a cell with gas diffusion electrodes.

The electrodes applied in fuel cells are commonly gas diffusion electrodes which macroscopically separate the gas chamber from the electrolyte. Within the pore system of the electrodes the three-phase boundary is formed, where the electro-chemical reactions take place.

Under load, the polarization of the electrodes causes a decrease in the output voltage of the galvanic cell. In the case of a hydrogen-oxygen fuel cell, the polarization is caused mainly by water, produced within the pores of the hydrogen electrode. Such reaction products are generally responsible for a considerable part of the polarization, because their removal out of the pore system is limited by diffusion processes.

It has long been recognized that the voltage decrease may be avoided by forcing gas through the porous electrode for a short time, when its polarization, measured by a reference electrode, reaches an inadmissible value. The gas blast removes the electrolyte and the reaction products out of the pore system of the electrode and therefore lowers the electrode polarization.

The use of a reference electrode for the purpose of regulating the gas-pushing means has various disadvantages. (i) The amount of electro-chemically produced energy consumed by the reference electrodes has to be very small, Therefore, a very sensitive amplifier is necessary for the generation of the regulating impulses, (ii) the potential of the reference electrode changes, which therefore has to be controlled and/or to be replaced, (iii) the arrangement of the reference electrode close to the controlled fuel cell electrode is complicated, because of the required high resistivity conducting wires and because of the mechanically weak measuring equipment. Besides, a compact and safe construction of the fuel cell is rendered more difficult.

It is an object of the present invention to avoid the aforesaid disadvantages by means of a special operating system for fuel cells with gas diffusion electrodes. The arrangement according to the invention is characterized (i) by using refillable gas tanks which feed the fuel cell with the reaction gases at operational pressure, varying between two fixed values and (ii) that approximately when the pressure in the gas tanks reaches the lower fixed value, the tanks are refilled automatically and (iii) that during the refilling period the gas pressure increases above the fixed value for a short time.

The accompanying drawings illustrate the details of the present invention.

The preferred arrangement according to the invention is a fuel cell electrode which is connected with a working gas tank and an auxiliary gas tank, through outlet valves, the gas pressure being higher in the auxiliary tank. Both gas tanks are connected with the same main gas tank through inlet valves. The outlet valve of the working gas tank and the inlet valve of the auxiliary gas tank are normally open but are closed during the refilling of the tanks. During the refilling process, the inlet valve of the working gas tank and the outlet valve of the auxiliary gas tank are open. All valves are operated by a pressure-sensitive switch, which is located in the gas pipe to the fuel cell.

Figure 1:
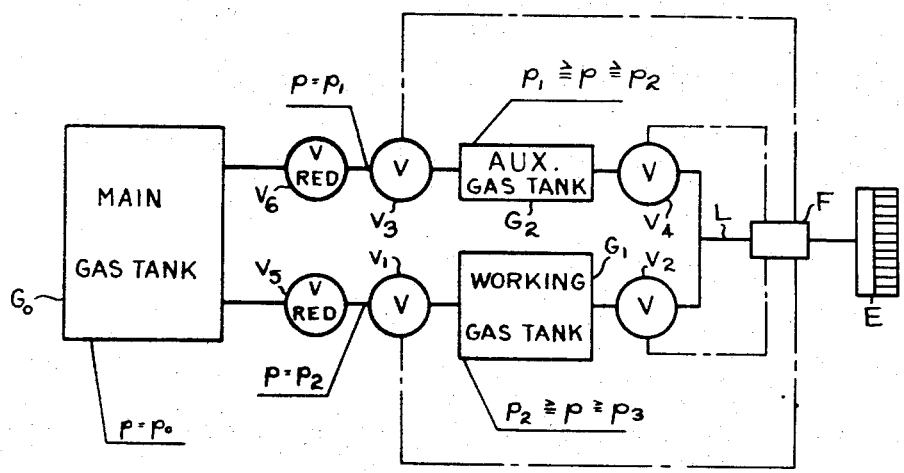
FIGURE 1 shows a schematic arrangement of the described invention.

Referring now to FIGURE 1, E is the fuel cell electrode with the gas feeding pipe L. $G_1$ designates the working gas tank with its outlet valve $V_2$, the gas pressure in which may change between the values $p_2$ and $p_3$ ($p_2 > p_3$). These values give the pressure limits for which the formation of the three-phase boundary inside the pore system of the electrode is possible without useless gas bubbling through the electrode.

The working gas tank is refilled from the main tank $G_0$ by way of open inlet valve $V_1$. Because of the high gas pressure $p_0$ in the main tank it is necessary to use a pressure reducing valve $V_5$, which provides the working tank with gas at a constant pressure $p_2 \cdot p_2$ is the upper fixed value of the operational pressure.

The outlet valve $V_4$ of the auxiliary gas tank $G_2$ is connected with the fuel cell electrode E in the same manner. The gas pressure of the auxiliary gas tank $G_2$ may change between an upper fixed value $p_1$ and a lower fixed value $p_2$. $V_3$ is the inlet valve. Gas is supplied to auxiliary tank $G_2$ from the main gas tank $G_0$ through inlet valve $V_3$. It is expedient to provide a pressure reducing valve $V_6$ in the line between tanks $G_0$ and $G_2$ by which the gas pressure is reduced from the value $p_0$ to the value $p_1$, which is the upper operational presure of the auxiliary tank $G_2$.

The four valves $V_1$, $V_2$, $V_3$, $V_4$ are magnetically or pneumatically operated by the pressure switch F which is arranged in the pipe L just in front of the fuel cell electrode. Since pressure responsive magnetic or pneumatic controls of this type are well known, their details have not been included and hence, the control relation as between pressure responsive switch F and the four valves has been indicated diagrammatically by the dash dot lines.

During the normal working period of the fuel cell, the outlet valve $V_2$ is open and $V_4$ is closed, whilst the inlet valve $V_1$ is closed and $V_3$ is open, the valves being articulated pneumatically by the pressure switch F. The gas pressure therefore decreases from the value in the main gas tank $G_0$ to that in the electrode.

The gas pressure in pipe L and consequently in the gas tank $G_1$ is controlled by the pressure switch F, by means of which the inlet valve $V_1$ is opened and the outlet valve $V_2$ is closed when the presure in pipe L decreases to the lower fixed value $p_3$. The tank $G_1$ is thus refilled.

Simultaneous closing of valve $V_3$ and opening of valve $V_4$, both connected to the auxiliary tank $G_2$, effects a gas blast at a pressure $p_1$, which is higher than the upper fixed value $p_2$ of the operational pressure, thus causing rinsing of the pore system of the electrode.

As soon as the pressure in the auxiliary tank $G_2$ at the pipe L reaches the fixed value $p_2$ again, the valve $V_4$ is closed and the valve $V_2$ is opened by means of the pressure switch F. Simultaneously, tank $G_1$ is separated from the main gas tank $G_0$ by closing valve $V_1$. The simultaneous opening of vale $V_3$ enables the tank $G_2$ (pressure limit $p_1$) to be refilled.

Figure 2:
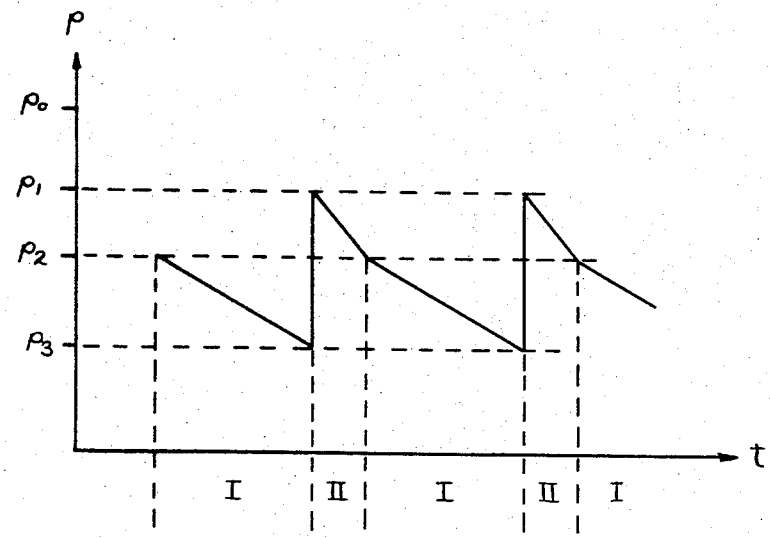
FIGURE 2 shows the temporary change of the gas pressure in the tanks during the working and refilling period.

FIGURE 2 shows the change of the gas pressure in pipe L as a function of the time. The working period I is the time, during which the connecting pipe E–$G_1$ is open. During the rinsing and refilling period (II), the electrode is connected to the auxiliary tank $G_2$ and subjected to a gas current, the pressure of which is higher than the upper operational fixed value of the electrode necessary for the electro-chemical reaction. The length of the periods I and II may be easily adjusted by the choice of suitable pressure and volume conditions for the gas tanks $G_1$ and $G_2$.

The present invention is based on the laws of Faraday and Boyle-Mariotte, according to which there is a relationship between (i) the decrease of the gas pressure in the gas tank, which feeds the fuel cell electrode (ii), the produced electric current and (iii), the concentration of unwanted reaction products within the pore system of the electrode. For a better understanding, this shall be described by means of an example of a hydrogen electrode in a hydrogen-oxygen fuel cell.

According to Faraday's law, 11.2 litres of hydrogen gas correspond to 26.8 ampere-hours, respectively 9 grams of water produced by the fuel cell reaction. The electro-chemical conversion of hydrogen in the fuel cell electrode will cause a decrease of the pressure in the hydrogen tank, which depends on the tank volume and which is given by the law of Boyle-Mariotte. The water, produced by the reaction of the hydrogen, which takes place at the three-phase boundary within the pore system of the electrode, corresponds to the aforementioned pressure decrease. This gas pressure decrease is equivalent to the production of a certain amount of water, which cannot be removed by diffusion alone.

According to the invention, the deterioration of the electrode, caused by the electro-chemical polarization, may be directly regulated by the pressure decrease in the gas tank. This is a special advantage compared to the use of a reference electrode. Another significant advance is based on the possibility of using the gas for regulating purpose before its conversion to electricity.

We claim:
1. In an arrangement for operating a fuel cell with a gas diffusion electrode, the combination comprising means providing a first supply of pressurized gas at a first predetermined pressure, a first pipe line means extending between said first gas supply means and said fuel cell electrode, said first pipe line means including therein a working gas tank, a first inlet valve interposed between the inlet to said working gas tank and said first gas supply means and a first outlet valve interposed between the outlet from said working gas tank and said fuel cell electrode, means providing a second supply of pressurized gas at a second predetermined pressure, a second pipe line means extending between said second gas supply means and said fuel cell electrode, said second pipe line means including therein an auxiliary gas tank, a second inlet valve interposed between the inlet to said auxiliary gas tank and said second gas supply means and a second outlet valve interposed between the outlet from said auxiliary gas tank and said fuel cell electrode, the predetermined pressure of the gas obtained from said second gas supply means being higher than the predetermined pressure of the gas obtained from said first gas supply means whereby the pressure of the gas existing in said auxiliary gas tank is higher than that which exists in said working gas tank when said tanks are gas filled, means sensing a decrease in pressure of the gas in said working gas tank from a predetermined initial value to a lower predetermined value as a result of cell operation to furnish electrical power, and means actuated by said pressure sensing means and effecting selective operation of said first and second inlet and outlet valves in accordance with the variation in gas pressure in said working gas tank between said predetermined initial and lower values such that said first outlet valve from said working gas tank and said second inlet valve to said auxiliary gas tank are normally open but are closed during refilling of said working gas tank, and such that also during refilling of said working gas tank said first inlet valve to said working gas tank and said second outlet valve from said auxiliary gas tank are open thereby to deliver gas from said auxiliary gas tank to said cell electrode to effect rinsing of the pore system of said electrode.

2. In an arrangement for operating a fuel cell with a gas diffusion electrode, the combination comprising; a main gas supply tank, first and second pipe lines extending between said main gas supply tank and said fuel cell electrode, said first pipe line including therein a working gas tank, a first inlet valve and a first pressure reducing valve interposed between the inlet to said working gas tank and the outlet from said main gas supply tank, and a first outlet valve interposed between the outlet from said working gas tank and said fuel cell electrode, said second pipe line including therein an auxiliary gas tank, a second inlet valve and a second pressure reducing valve interposed between the inlet to said auxiliary gas tank and the outlet from said main gas supply tank, and a second outlet valve interposed between the outlet from said auxiliary gas tank and said fuel cell electrode, the outlet pressure from said second pressure reducing valve being higher than that from said first pressure reducing valve whereby the gas pressure existing in said auxiliary gas tank is higher than that which exists in said working gas tank when said tanks are gas filled, means sensing a decrease in pressure of the gas in said working gas tank from a predetermined initial value to a lower predetermined value as a result of cell operation to furnish electrical power, and means actuated by said pressure sensing means and effecting selective operation of said first and second inlet and outlet valves in accordance with a variation in the gas pressure in said working gas tank between said predetermined initial and lower values such that said first outlet valve from said working gas tank and said second inlet valve to said auxiliary gas tank are normally open but are closed during refilling of said working gas tank from said main gas tank, and such that also during refilling of said working gas tank said first inlet valve to said working gas tank and said second outlet valve from said auxiliary gas tank are open thereby to deliver gas from said auxiliary gas tank to said cell electrode and effect rinsing of the pore system of said electrode.

3. An arrangement as defined in claim 2 for operating a fuel cell wherein said means actuated by said pressure sensing means and effecting selective operation of said first and second inlet and outlet valves includes a gas-pressure responsive switching means located in said pipe lines between said first and second outlet valves and said fuel cell electrode.

4. An arrangement as defined in claim 2 for operating a fuel cell wherein said first and second pipe lines include a pipe section in common to both lines and which is located between said first and second outlet valves and said fuel cell electrode, and wherein said means actuated by said pressure sensing means and effecting selective operation of said first and second inlet and outlet valves includes a gas-pressure responsive switching means located in said common pipe line section.

References Cited

UNITED STATES PATENTS

| | | | |
|---|---|---|---|
| 25,212 | 7/1962 | Kling | 137—392 X |
| 2,899,969 | 8/1959 | Kirby | 137—113 X |
| 2,947,797 | 8/1960 | Justi et al. | 136—86 |
| 3,141,796 | 7/1964 | Fay et al. | 136—86 |
| 3,180,763 | 4/1965 | Miller et al. | 136—86 |
| 3,220,937 | 11/1965 | Friese et al. | 136—86 X |

WINSTON A. DOUGLAS, *Primary Examiner.*

H. FEELEY, *Assistant Examiner.*